UNITED STATES PATENT OFFICE.

EDWARD W. HASLUP, OF BRONXVILLE, NEW YORK, AND BENJAMIN A. PEACOCK, OF PHILADELPHIA, PENNSYLVANIA; SAID PEACOCK ASSIGNOR TO SAID HASLUP.

PROCESS OF PRODUCING POTASSIUM AND PHOSPHORUS COMPOUNDS.

1,270,515.  Specification of Letters Patent.  Patented June 25, 1918.

No Drawing.  Application filed October 29, 1917. Serial No. 199,171.

*To all whom it may concern:*

Be it known that we, EDWARD W. HASLUP and BENJAMIN A. PEACOCK, both citizens of the United States, respectively residing at Bronxville, Westchester county, New York, and Philadelphia, Philadelphia county, Pennsylvania, have invented certain new and useful Improvements in Processes of Producing Potassium and Phosphorus Compounds; and we do hereby declare the following to be a full, clear, and exact description of the invention, such as will enable others skilled in the art to which it appertains to make and use the same.

This invention relates to a process of recovering soluble potassium and phosphorus compounds from naturally occurring minerals and has for its object to produce these products in a manner more efficient and less costly than has been heretofore proposed.

With these and other objects in view the invention consists in the novel steps and combinations of steps constituting the process all as will be more fully hereinafter disclosed and particularly pointed out in the claims.

In order that the precise invention may be the more clearly understood it is said:—It is well known when feldspar and other potassium bearing silicates are mixed with phosphate rock in a finely divided condition, and the mixture is treated with acid, in a manner similar to that employed in the ordinary process of making acid phosphate from phosphate rock, that more or less of the potassium in the feldspar is converted into the form of a sulfate, and that in such form it is soluble in water, and is available as a potassium fertilizer. There is, however, a considerable waste of acid experienced in the unavoidable formation of soluble aluminum salts, chiefly from the aluminum present in the silicate rock, which almost always carries this element in considerable proportions.

In addition to this waste of acid, it is equally well known that the soluble phosphates produced as a result of the said treatment come into contact with said soluble aluminum salts, and react with the latter to form aluminum phosphates by a double decomposition between the soluble aluminum salts and the acid calcium phosphates present in the mixture. While laboratory tests do not betray any serious loss due to a reversion of the formed aluminum phosphates, yet, in actual tests on a large scale in the soil this reversion is shown to be so serious that the crop making value of phosphates made as above outlined is very greatly reduced. Again, actual trials in the field have shown that the presence of aluminum salts in the acid phosphates thus produced tends to bring about a wet plastic physical condition, which curtails the usefulness of such phosphates in ordinary fertilizer drills, and therefore, very greatly reduces the value of said phosphates as fertilizers in practical agriculture.

This invention overcomes the above objections while still making use of the above acid-phosphate making reaction, and produces from a mixture of feldspar or other potassium bearing silicate and phosphate rock soluble potassium and phosphorus compounds in a form that is suitable for agriculture and other purposes, in a manner now to be disclosed.

In carrying out the invention there is provided a suitable finely divided mixture of say feldspar and phosphate rock, sulfuric acid in excess of that sufficient to react with all the potassium and phosphorus present is added to the mixture, whereupon the wet mass is transferred to a closed vessel or "den" having its walls heat insulated, or other provisions made for conserving the heats of reaction. The heat evolved from the reactions going on in the mass being thus prevented from escaping, the temperature of the mass will rise in the course of 24 or 48 hours to say 200° C., or 300° C., according to the richness of the reacting constituents. As the temperature rises above 200° C, the free sulfuric acid will attack the silicates and decompose them, and this decomposition will be aided by any small proportion of fluorids that may be present.

After say 24 to 48 hours the "den" is opened, and the mass treated with water, to extract the formed mono-calcium phosphate, and potassium sulfate, together with any other soluble products present. It will be found that the solution thus obtained is strongly acid, is very corrosive to any ordinary evaporating container, and that it cannot be concentrated except at a prohibitive expense. Further, it will be found that this said crude solution upon evaporation loses considerable proportions of its soluble phosphates owing to the formation of complex salts with the combined iron and aluminum present.

On the other hand, according to this invention, instead of concentrating said crude solution, it is treated with the crude hydrates or carbonates of the alkali-metals or crude ammonia liquor in quantities sufficient to convert all acid salts present to the form of neutral salts, whereupon the iron, aluminum and calcium compounds present are precipitated, and are later separated out as by filtration.

The combined potassium and phosphorus remain in the filtrate as sulfuric and phosphoric acid compounds, and being in a neutral condition, are concentrated by heat, and the crude salts separated out as by fractional crystallization or other suitable procedure.

By following the procedure above outlined, it will now be clear that if suitable neutralizing hydrates or carbonates are added to the above mentioned crude liquor solution, the phosphoric acid may be recovered in the form of a sodium, ammonium, or potassium phosphate, and as either di- or tri-salts, while the potassium may be recovered as a fairly pure sulfate.

It is obvious that those skilled in the art may vary the details of the process without departing from the spirit of the invention, and therefore, it is not desired to limit the invention to the foregoing procedure except as may be required by the claims.

What is claimed is:—

1. The process of recovering combined potassium mixed with combined phosphorus from a mixture of potassium bearing silicate and phosphate rocks which consists in finely dividing said rocks; treating the finely divided rock mixture with sulfuric acid; confining the acidulated mixture in a closed vessel from which the heat of reaction is prevented from escaping until a substantial portion of said silicate is decomposed; extracting the soluble compounds thus produced with water; and neutralizing the acid salts present to separate out by precipitation the aluminum compounds from the phosphorus and potassium compounds contained in the solution, substantially as described.

2. The process of recovering combined potassium mixed with combined phosphorus from a mixture of potassium bearing silicate and phosphate rocks which consists in finely dividing said rocks; treating the finely divided rock mixture with sulfuric acid; confining the acidulated mixture in a closed vessel from which the heat of reaction is prevented from escaping until a temperature above 150° C. has been reached and until a substantial portion of said silicate is decomposed; extracting the soluble compounds thus produced with water; adding an acid-neutralizing reagent to the crude solution thus obtained to precipitate the combined aluminum present and to render neutral the potassium and phosphorus compounds contained in said solution; and separating out said last named compounds, substantially as described.

3. The process of producing a mixture of potassium and phosphorus compounds from a mixture of a potassium bearing silicate rock and a natural phosphate rock, which consists in finely dividing said rocks; treating said finely divided rock material with sulfuric acid; extracting from the acidulated mixture after reaction a crude acid solution containing combined phosphorus, potassium, and aluminum; neutralizing said crude solution by adding a compound having a strong alkaline reaction, and precipitating the combined aluminum present; and separating out said combined phosphorus and potassium, substantially as described.

In testimony whereof, we affix our signatures.

EDWARD W. HASLUP.
BENJAMIN A. PEACOCK.